United States Patent
Malvern

[11] Patent Number: 5,459,575
[45] Date of Patent: Oct. 17, 1995

[54] LASER FIBER OPTIC GYROSCOPE HAVING PHASE MODULATION

[75] Inventor: Alan R. Malvern, Devon, United Kingdom

[73] Assignee: British Aerospace PLC, Farnborough, United Kingdom

[21] Appl. No.: 202,117

[22] Filed: Feb. 25, 1994

[30] Foreign Application Priority Data

Feb. 27, 1993 [GB] United Kingdom ............ 9304016

[51] Int. Cl.[6] .................................................. G01C 19/72
[52] U.S. Cl. ............................................................ 356/350
[58] Field of Search ............................................... 356/350

[56] References Cited

U.S. PATENT DOCUMENTS

| 4,765,739 | 8/1988 | Koizumi et al. | 356/350 |
| 4,776,700 | 11/1988 | Frigo. | |
| 4,871,254 | 10/1989 | Lefevre et al.. | |
| 4,883,358 | 11/1989 | Okada | 356/350 |
| 5,141,316 | 8/1992 | Lefevre et al. | 356/350 |

FOREIGN PATENT DOCUMENTS

| 0291368 | 11/1988 | European Pat. Off.. |
| 0511684 | 11/1992 | European Pat. Off.. |
| 2676537 | 11/1992 | France. |

OTHER PUBLICATIONS

Bohm et al., Fiber Optic Gyro With Digital Data Processing, OFS '84 Conference Proceedings—2nd International Conference On Optical Fiber Sensors, Sep. 5–7, 1984, pp. 251–258.

Primary Examiner—Samuel A. Turner
Attorney, Agent, or Firm—Cushman, Darby & Cushman

[57] ABSTRACT

In a laser gyroscope, a non-reciprocal phase modulation is introduced between the clockwise (CW) and counterclockwise (CCW) beams at a modulation frequency (f). The CW and CCW beams are combined on a detector and the intensity of the output is observed at the fundamental frequency (f) and the higher harmonics (e.g. 2f, 4f). At each frequency, the detected signal is demodulated by mixing it with a reference signal at the same frequency and stepping the phase of the signal through successive increments of 90°, thereby to determine the in-phase and quadrature components for each frequency monitored.

8 Claims, 5 Drawing Sheets

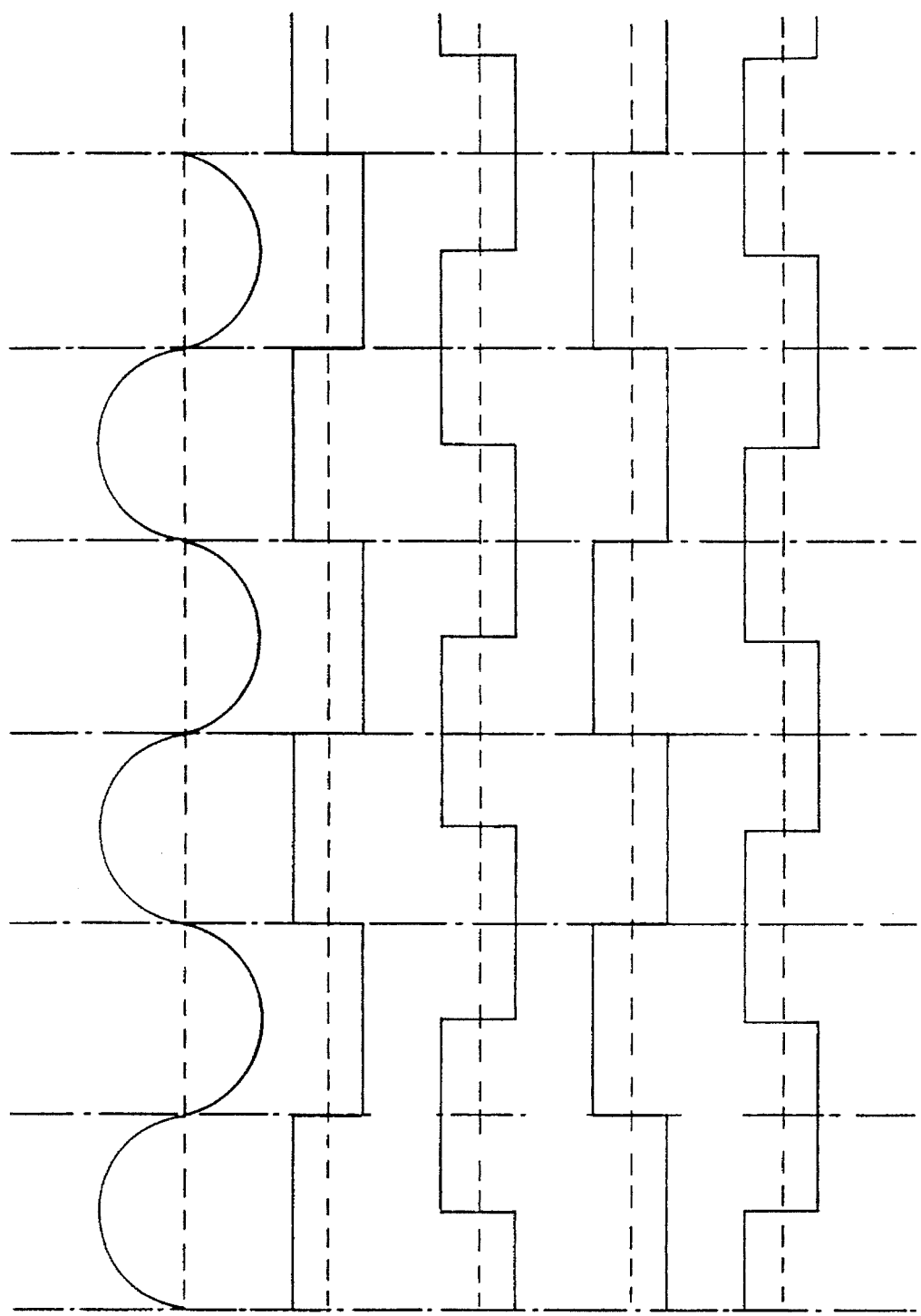

5,459,575

LASER FIBER OPTIC GYROSCOPE HAVING PHASE MODULATION

FIELD OF THE INVENTION

This invention relates to laser gyroscopes and in particular, but not exclusively, to open loop fiber optic gyroscopes.

BACKGROUND OF THE INVENTION

In a fiber optic gyroscope a clockwise (CW) beam and a counterclockwise (CCW) beam pass around a coil of optical fiber and are brought together on leaving the coil to interfere on a detector. When rotation is applied to the gyroscope a rate-related non-reciprocal phase shift is introduced between the CW and CCW beams which varies the intensity on the detector. In some closed loop designs of such gyroscopes, a further compensatory, non-reciprocal phase shift is applied to "null" the rotation-induced phase shift and the applied rate is then determined on the basis of the amount of the compensatory phase shift required. In these designs, the intensity of the signal on the detector is used in the gyroscope control loop but is not used as an absolute measure of the applied rate. However, the processing of such closed loop gyroscopes means that they are complex, requiring precision modulators and are thus expensive to produce.

In an open loop gyroscope, the applied rate is determined on the basis of the variation in intensity of the combined CW and CCW signals and so accuracy in measurement of the intensity is very important if the gyroscope is to provide accurate readings over a large dynamic range.

Thus, a need exists for an open loop fiber optic gyroscope which implements a processing technique which allows accurate determination of the variations in intensity due to applied rate, preferably reducing some of the errors associated with relatively low cost phase modulators and offset errors in general.

SUMMARY OF THE INVENTION

Accordingly, in one aspect, this invention provides a laser gyroscope, comprising:

means defining a ring or coil around a sensing axis and around which light may propagate in clockwise (CW) and counterclockwise (CCW) directions;

beam input means for introducing into the ring or coil a clockwise (CW) beam and a counterclockwise (CCW) beam to propagate in opposite directions around the ring or coil;

phase modulation means for generating a phase modulation signal for applying a phase modulation between the CW and CCW beams at a modulation frequency (f);

means for combining the CW and CCW beams after passage around the ring or coil;

detector means for detecting said combined CW and CCW beams, and processor means for monitoring the intensity of the output of the detector means at a plurality of integral multiples of the modulation frequency (f), thereby to determine the rate applied to the gyroscope, the processor means including reference signal generating means operable to generate reference signals corresponding to each of the integral multiples of the modulation frequency and, for each reference signal, to adjust the phase thereof between a plurality of values, and mixer means for demodulating the output of the detector means to obtain outputs for each of the reference signals and phases, thereby to determine the in-phase and quadrature components of the intensity for each frequency monitor.

By isolating the in-phase and quadrature components for each frequency n.f monitored, the signal amplitude is determine.

By deriving the in-phase and quadrature components of each intensity $I_n$ from phase-shifted values, a term is extended which is representative of the intensity but which does not depend strongly on the relative phase ($\phi$) of the phase modulation, and therefore is not significantly adversely affected by the phase performance of the phase modulation means.

Preferably, the signal generating means is operable to shift the phase of each reference signal by 0°, 90°, 180° and 270°, and the output of the mixer means for each of these values is used to extract the in-phase and quadrature components of the intensity for a reference signal at a particular frequency or harmonic, In the preferred arrangement described herein, the processor looks at a plurality of frequencies or "harmonics" so that the unknowns, $I_o$ (intensity factor), $\beta$ (modulation index) and $\Omega$ (applied rate) in the following equations defining the components ($I_n$) of the intensity sensed at a frequency n.f may be determined:

$I_1 = I_o J_1(\beta) \sin S\Omega$ $I_2 = I_o J_2(\beta) \cos S\Omega$ $I_4 = I_o J_4(\beta) \cos S\Omega$ \hfill (1)

S is the scale factor and is usually fixed for a particular gyroscope and may be determined experimentally, and $J_n(\beta)$ is the $n^{th}$ Bessel function of $\beta$. In other words, by monitoring the intensity at several different frequencies, the processor means extracts sufficient information to eliminate or reduce the effect of many of the factors which impair the accuracy of the gyroscope.

Preferably, the processor means determines the ratios between the intensities observed at the various frequencies thereby to determine the applied rate. This may enhance the accuracy of the readings by implementing an effect similar to common mode rejection.

In a preferred embodiment, the processor means monitors the intensities $I_1$, $I_2$ and $I_4$ at the modulation frequency (f), twice the modulation frequency (2f), and four times the modulation frequency (4f), respectively. The applied rate is then determined by taking the following ratios:

$$R_1 = \frac{I_1}{I_2} = \frac{J_1(\beta)}{J_2(\beta)} \tan(S\Omega) \quad \text{Equation (2)}$$

$$R_2 = \frac{I_4}{I_2} = \frac{J_4(\beta)}{J_2(\beta)}$$

The modulation index ($\beta$) can be calculated knowing $R_2$, so $\Omega$ can be calculated from the equation:

$$\Omega = \frac{1}{S} \tan^{-1}\left( \frac{R_1 J_2(\beta)}{J_1(\beta)} \right) \quad \text{Equation (3)}$$

The in-phase ($I_i$) and quadrature ($I_q$) components are preferably determined according to the following formulae, wherein I(X) is the intensity at phase X°:

$$I_i = \frac{I(0) - I(180)}{2} \quad \text{Equation (4)}$$

$$I_q = \frac{I(90) - I(270)}{2}$$

Whilst the invention has been described above it extends to any combination of the features set out above or in the following description.

BRIEF DESCRIPTION OF THE DRAWINGS

The invention may be performed in various ways and an embodiment thereof will now be described in detail, with reference being made to the accompanying drawings; in which:

FIGS. 5(a) to 5(e) are timing diagrams for demodulation using square wave reference to mixer showing FIG. 5(a) a schematic version of the signal at the input to the mixer, and FIGS. 5(b) to 5(e) to the reference signals at 0°, 90°, 180° and 270° phase respectfully relative to the input signal.

DESCRIPTION OF PREFERRED EMBODIMENT

Figure 1:
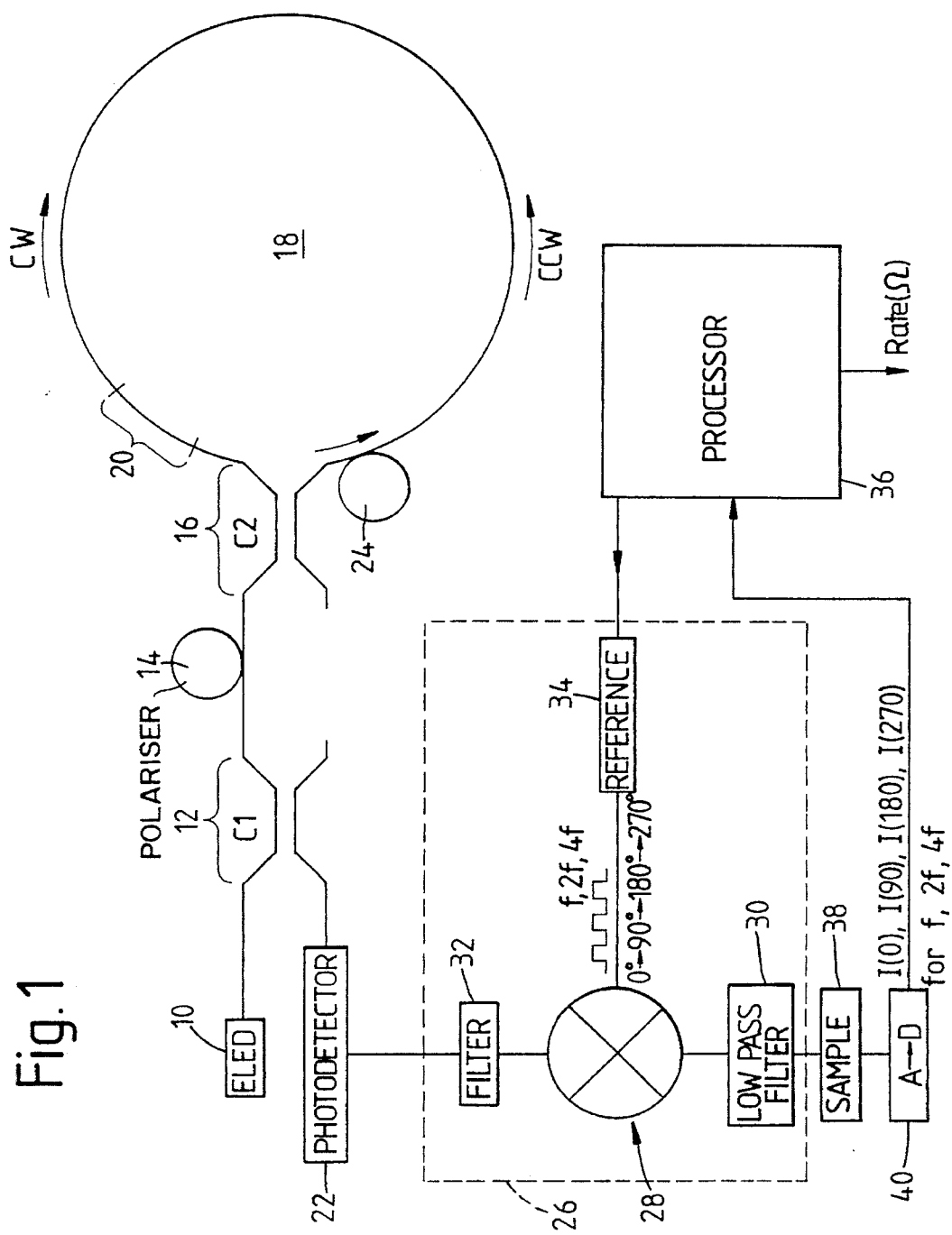
FIG. 1 is a schematic diagram of an open-loop interferometric fiber optic gyroscope in accordance with the invention.
Figure 2:
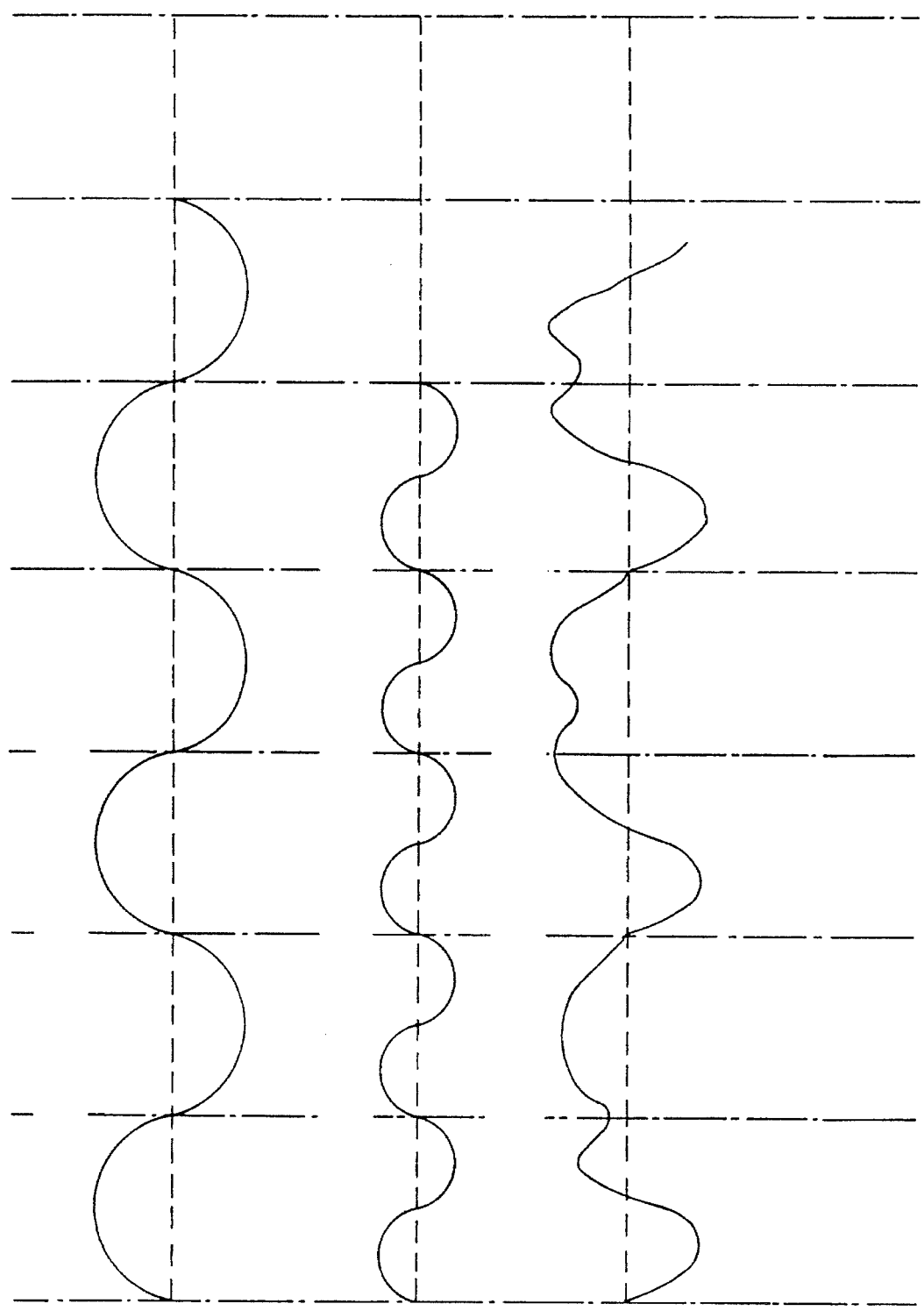
FIGS. 2(a) to 2(c) are timing diagrams showing FIG. 2(a) typical traces for the piezo drive signal at 450 kHz, FIG. 2(b) the signal on the photodetector at zero rate and FIG. 2(c) the signal on the photodetector when rate is applied.

In the embodiment of open loop interferometric fiber optic gyroscope (IFOG) illustrated in FIG. 1, light from a broad band source 10 is fiber-coupled to a 50:50 coupler or splitter 12. The light then goes through a polarizer 14 to another 50:50 coupler or splitter 16 to split the beam into a CW and a CCW beam which are passed into the opposite ends of a fiber optic coil 18, typically 200 m in length. A depolarizer 20 is provided in the CW inlet end of the coil 18. After the CW and CCW beams have passed around the coil they are re-combined by the coupler or splitter 16 and then passed via the coupler or splitter 12 to a photodetector 22.

A phase modulator 24, here made of a small cylinder of piezoelectric material with a part of the coil fiber wrapped around it and glued in place, is located in the CCW inlet end of the coil so that the CCW beam is phase-modulated before entry into the coil and the CW beam is phase modulated on leaving the coil.

Where, as here, the phase modulator 24 is physically relatively small, a high numerical aperture fiber is required to reduce the light loss from the fiber around the piezoelectric cylinder.

The output of the photodetector 22 is processed as to be described below to detect the rate applied to the gyroscope and to produce an output signal accurately proportional to rate.

Figure 3:
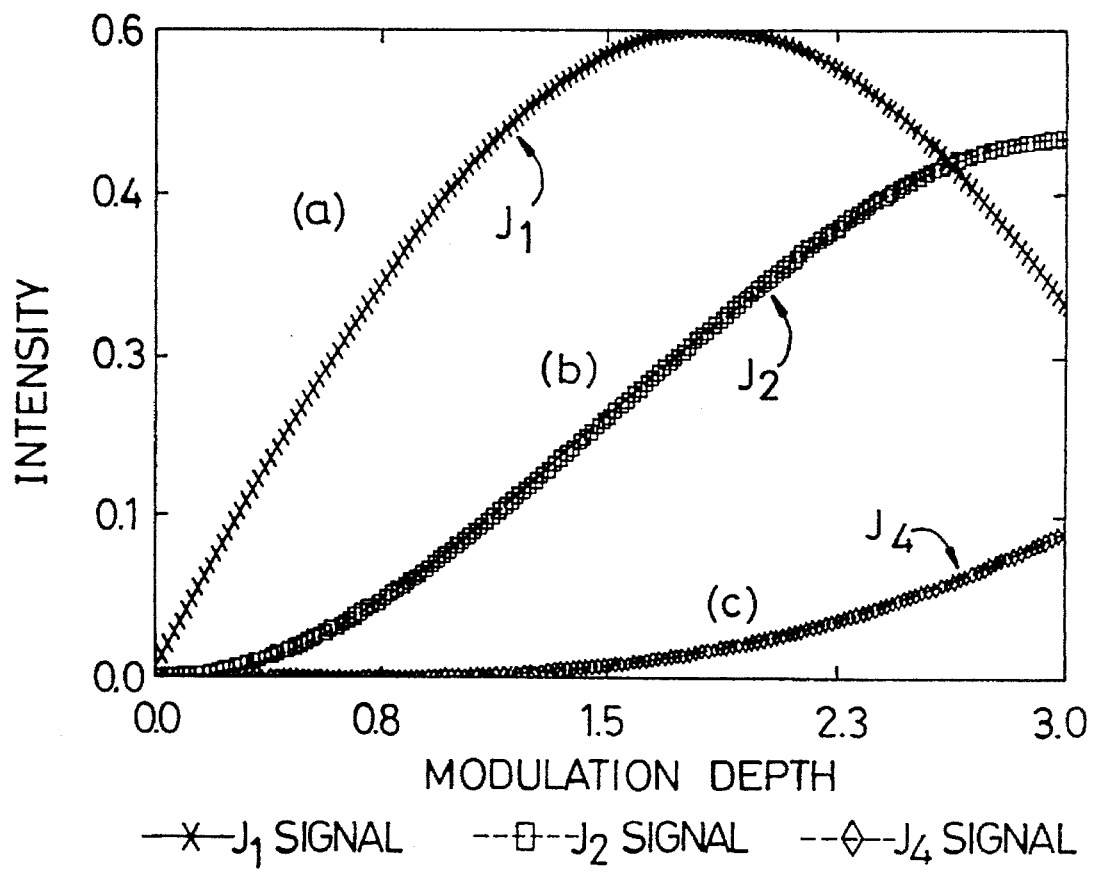
FIG. 3 is a diagram showing typical curves for the intensities $I_1$, $I_2$ and $I_4$ on the photodetector of the open-loop interferometric fiber optic gyroscope in accordance with the present invention at zero rate, for (a) the fundamental frequency of the phase modulation, (b) the second harmonic thereof, and (c) the fourth harmonic respectively, as a function of modulation index or depth $\beta$.

The phase modulator is driven by a sinusoidal drive signal at a frequency (f) chosen to match the transit time ($\tau$) of the fiber coil 18 according to the relationship:

$$f = \frac{1}{2\tau} \quad \text{Equation (5)}$$

so that the CW and CCW beams have a maximum phase difference of 180° when combined at coupler 16. For a typical coil length of 200 m of fiber, this corresponds to a drive frequency of about 450 kHz. The 180° phase difference is highly beneficial because a number of errors are removed or reduced. The second harmonic distortion of the phase modulator is no longer an error driver. Also the spurious intensity modulation observed at the photodetector is no longer a problem. The amplitude $\beta$ is chosen to give the largest signal at the frequency (f). FIG. 3 shows that this corresponds to a modulation index or depth $\beta$ of about 2.

The modulation depth or index $\beta$ is dimensionless and is defined by the following general relationship:

$$I \propto \cos(\alpha + \beta \cos \omega t) \quad (6)$$

Where I is the intensity of the combined CW and CCW beams, $\alpha = S\Omega t$, and $\omega$ is the modulation frequency.

The signals at the photodetector are principally at three frequencies as follows:

$$I_1 = I_0 J_1(\beta) \sin S\Omega$$

$$I_2 = I_0 J_2(\beta) \cos S\Omega$$

$$I_4 = I_0 J_4(\beta) \cos S\Omega \quad (1)$$

where the signals are at frequencies f, 2f and 4f, S is the gyro scale factor and $\Omega$ is the angular rate. The values of the Bessel functions are shown in FIG. 3, and the following ratios are determined:

$$R_1 = \frac{I_1}{I_2} = \frac{J_1(\beta)}{J_2(\beta)} \tan(S\Omega) \quad \text{Equation (2)}$$

$$R_2 = \frac{I_4}{I_2} = \frac{J_4(\beta)}{J_2(\beta)}$$

Figure 4:
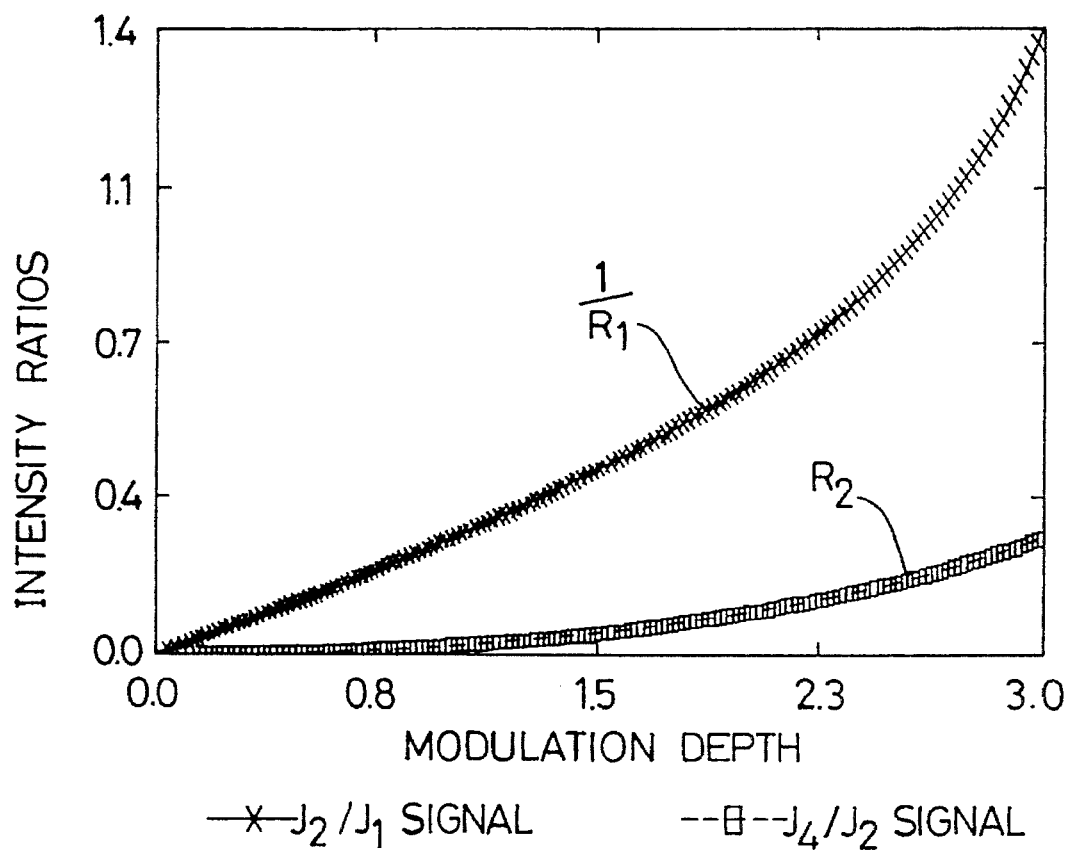
FIG. 4 is a diagram of the open-loop interferometric fiber optic gyroscope in accordance with the present invention showing the ratios $R_1$ and $R_2$ between the intensities $I_1$ and $I_2$, and $I_4$ and $I_2$ as a function of modulation index or depth $\beta$.

The ratios $R_1$ and $R_2$ are shown in FIG. 4.

The ratio R is used to determine the angular rate by taking inverse tangents as follows:

$$\Omega = \frac{1}{S} \tan^{-1}\left(\frac{R_1 J_2(\beta)}{J_1(\beta)}\right) \quad \text{Equation (3)}$$

Thus, in this example, information is extracted at three frequencies and is used to solve three simultaneous expressions in Equation (1) to extract the rate, $\Omega$. In this example the information is extracted from the photodetector at frequencies f, 2f and 4f. However, information could be extracted at other harmonics, but even harmonics are preferred because they vary with $\cos S\Omega$ and are therefore large at zero or low rate. Also at higher harmonics the $J_n(\beta)$ term becomes smaller and grows more slowly, which degrades the accuracy. The accuracy of the extract needs to be very high for $I_1$ as a rate range from 1 deg/hour to 500 deg/sec is required and this corresponds to a dynamic range of $2 \times 10^6$.

For $I_2$ and $I_4$ an accuracy of about 1 part in 1000 is required, as the scale factor accuracy is determined by how accurately these signals are extracted.

To determine the rate, the present embodiment demodulates the signal on the photodetector 22 to extract the in-phase and quadrature components of the amplitude or intensity of the signal at three different frequencies. A demodulation scheme using a conventional lock-in amplifier would only detect the amplitude of the in-phase component and so would not provide the amplitude information required in this embodiment.

Referring to FIG. 1, in broad outline, the demodulator 26 is configured as a multiplier, e.g. including a Burr-Brown MPY 600 analogue mixer 28. A reference signal is used at the same frequency that is sought. The output of the mixer 28 is low pass filtered by low pass filter 30 to remove the 2n.f component and the low frequency version is then used as a measure of the signal at frequency n.f. This is shown in Equation (7) below where the output signal is $I_{DEMOD}$:

$$I_{DEMOD} = a_{n,f}b\{\sin\omega t \cdot \sin(\omega t + \phi)\} \quad \text{Equation (7)}$$
$$= \frac{a_{n,f}b}{2} \cos\phi$$

where $a_{n,f}\sin(\omega t+\phi)$ is the input signal with information at n.f, $b\sin\omega t$ is the mixer, and $\phi$ is the phase shift due to the piezo on the signal compared to the reference to the mixer.

To determine both the in-phase ($I_i$) and quadrature signals ($I_q$), a two phase demodulation is used so that the signal amplitude 'a' can be determined from the outputs as follows:

$$I_i = ab\cos(\phi) \quad \text{Equation (8)}$$
$$I_q = ab\sin(\phi)$$
$$I_r = \sqrt{(I_i^2 + I_q^2)} = |ab|$$

This assumes that $\phi$ does not vary significantly whilst the $I_i$ and $I_q$ measurements are taken. For this reason the phase modulator 24, which whilst low cost has a poor phase performance, should be operated well away from its mechanical or electrical resonance, where the phase $\phi$ changes abruptly through 180°.

The above two stage demodulation could be carried out by supplying a reference $b\sin(\omega t)$ to obtain the in-phase component $I_i$ and a reference $b\cos(\omega t)$ to obtain the quadrature signal $I_q$, but the present embodiment implements a special processing technique which involves manipulating the phase of the reference signal to extract the $I_i$ and $I_q$ signals for each frequency.

Thus, the demodulator includes a filter 32 before the mixer to give only a single frequency for the signal. This prevents the effects of intermodulation distortion and second harmonic distortion of the reference. A reference signal generator 34 controlled by a processor 36 provides a square wave for the reference, as this can be represented by a harmonic series of odd harmonics. The higher harmonics (3rd, 5th etc), when mixed with the signal, only give rise to even harmonics, and these are eliminated by the low pass filter at the output of the mixer. The square wave reference can be formed, and can easily have its phase changed, by deriving the signal from a higher frequency clock. A further advantage of a square wave obtained digitally is that its amplitude can be fixed. However other waveforms e.g. triangular etc, could be used for the reference instead.

FIGS. 5(a) to 5(e) show typical timing diagrams of the reference signals and the input signal in this technique. The reference phase is shifted in the following sequence: 0°; 90°; 180°; 270°.

This is carried out for all three channels at frequencies f, 2f and 4f one after the other, so that the whole sequence is completed in about 1 msec. This is important to ensure that the bandwidth of the gyro is maintained. The change from 0° to 180°for the reference reverses the sense of the output signal due to the input signal, but leaves any output offset from the multiplier unaffected. In this way it is possible to eliminate the output offset of the mixer, which is typically 0.1% of full scale. In the same way the change from 90° to 270° reverses the quadrature signals but not the offsets, and hence these offsets can be removed.

The in-phase and quadrature signals are thus extracted for each frequency by detecting the intensities at that frequency when the phase of the reference is 0°, 90°, 180° and 270° and then calculating $I_i$ and $I_q$ as follows:

$$I_i = \frac{I(0) - I(180)}{2} \quad \text{Equation (4)}$$

$$I_q = \frac{I(90) - I(270)}{2}$$

The output of the low pass filter is sampled by sampler 38, and an analogue to digital convertor 40 is then used. For a 0.1% scale factor accuracy, a 12 bit analogue to digital converter can be used, and this has low cost. This can be multiplexed between the 3 channels, as the analogue to digital conversion typically takes a few microseconds for a low cost device. Within the 1000 microseconds for the complete cycle, 12 readings need to be taken (3 frequencies and four phases at each frequency), allowing 80 microseconds per reading.

For the 1f signal autoranging is desired, with an amplifier giving switchable gains of 1, *10, *100 and *1000 so that the signal is always greater than 1 bit of the 12 bit A/D, so there is not a loss of accuracy in the sampling.

To determine the absolute values $I_1$, $I_2$, $I_4$, the values $I(0)$, $I(90)$, $I(180)$, $I(270)$ for a particular frequency f, 2f, 4f are determined and combined as in Equation (4) to determine $I_i$ and $I_q$. Then $I_i$ and $I_q$ are substituted in Equation (8) to obtain |ab| for that frequency, which represents the absolute value of the intensity I at that frequency. |ab| provides a measure of 'a' as b is the intensity of the square wave reference, which is easily controllable and remains constant throughout the readings. This is repeated for the other two frequencies so that $I_1$, $I_2$ and $I_4$ are obtained and $\Omega$ determined from Equations (2) and (3). Because |ab| is obtained, the sign of 'a' will have been lost and thus also the sense of rotation, but this can be retrieved by observing the value of $\phi$ (the relative phase between the piezo drive and the output signal). From Equation (8) above, $$\frac{I_q}{I_i} = \frac{ab\sin(\phi)}{ab\cos(\phi)} = \tan(\phi) \quad \text{Equation (9)}$$

$$\therefore \phi = \tan^{-1}\left(\frac{I_q}{I_i}\right)$$

If $\phi$ is greater than ±90°, then $I_q$ is greater than $I_i$ and the sign of 'a' is inverted, thereby indicating a negative rotation.

The reference generator 34 is controlled by the processor 36 which also receives from the analogue to digital converter 40 values of $I(0)$, $I(90)$, $I(180)$ and $I(270)$ for each of the frequencies f, 2f and 4f and performs the calculations to determine the applied rate $\Omega$. The processor 36 also controls the single frequency sine wave drive to the phase modulator 24.

In these embodiments, the f, 2f and 4f signals all share a common path and the same demodulator 26 thus providing effective common mode rejection, and this is enhanced by using ratios of the f 2f and 4f signals, In this way, the phase offset of the mixer can be eliminated or significantly reduced.

Although the illustrated embodiment comprises an open loop fiber optic gyroscope in which the intensity terms at 1f, 2f and 4f are detected by observing the in-phase and quadrature components at these frequencies, the invention may be applied to many other laser gyroscopes. For example the technique may be used to reduce offsets and the effect of poor phase response of the phase modulator in a closed loop gyroscope. Here the gyroscope will look at a single frequency but detect the intensity signal at a plurality of different phases and then combine these phases to determine the intensity.

Also, different types of phase modulators may be used, for example a modulator consisting of an electro-optic polymer or polymers overlaid on the optical fiber.

I claim:

1. A laser gyroscope, comprising:
   means defining at least one of a ring and a coil around a sensing axis and around which light may propagate in clockwise (CW) and counterclockwise (CCW) directions;
   beam input means for introducing into said at least one of said ring and said coil a clockwise (CW) beam and a counterclockwise (CCW) beam to propagate in opposite directions around at least one of said ring and said coil;
   phase modulation means for generating a phase modulation signal for applying a phase modulation between said CW and CCW beams at a modulation frequency (f);
   means for combining said CW and CCW beams after passage around said at least one of said ring and said coil;
   detector means for detecting said combined CW and CCW beams; and
   processor means for monitoring an intensity of an output of said detector means at a plurality of integral multiples of said modulation frequency (f), thereby to determine a rate applied to said gyroscope, said processor means including:
      reference signal generating means for generating a plurality of reference signals corresponding to each of said integral multiples of said modulation frequency and, for each one of said plurality of reference signals, adjusting a relative phase thereof between a plurality of values, said reference signal generating means shifting said relative phase of each one of said plurality of reference signals by 0°, 90°, 180°, 270°, and
      mixer means for demodulating said output of said detector means, to thereby determine in-phase and quadrature components of said intensity for each frequency monitored for a given reference signal.

2. A laser gyroscope according to claim 1, wherein said in-phase ($I_i$) and quadrature ($I_q$) components are determined according to the following formulae, wherein I(X) is an intensity at phase X°:

$$I_i = \frac{I(0) - I(180)}{2}$$ Equation (4)

$$I_q = \frac{I(90) - I(270)}{2}.$$

3. A laser gyroscope, comprising:
   means defining at least one of a ring and a coil around a sensing axis and around which light may propagate in clockwise (CW) and counterclockwise (CCW) directions;
   beam input means for introducing into said at least one of said ring and said coil a clockwise (CW) beam and a counterclockwise (CCW) beam to propagate in opposite directions around said at least one of said ring and said coil;
   phase modulation means for generating a phase modulation signal for applying a phase modulation between said CW and CCW beams at a modulation frequency (f);
   means for combining said CW and CCW beams after passage around said at least one of said ring and said coil;
   detector means for detecting said combined CW and CCW beams; and
   processor means for monitoring an intensity of an output of said detector means at said modulation frequency (f), said processor means including:
      reference signal generating means for generating a reference signal and adjusting a relative phase thereof between a plurality of values, said reference signal generating means shifting said relative phase of said reference signal by 0°, 90°, 180°, 270°, and
      mixer means for demodulating said output of said detector means, to thereby determine in-phase and quadrature components of said intensity at said modulation frequency (f).

4. A laser gyroscope according to claim 3, wherein said in-phase ($I_i$) and quadrature ($I_q$) components are determined according to the following formulae, wherein I(X) is an intensity at phase X°:

$$I_i = \frac{I(0) - I(180)}{2}$$ Equation (4)

$$I_q = \frac{I(90) - I(270)}{2}.$$

5. A laser gyroscope, comprising:
   means defining at least one of a ring and a coil around a sensing axis and around which light may propagate in clockwise (CW) and counterclockwise (CCW) directions;
   beam input means for introducing into said at least one of said ring and said coil a clockwise (CW) beam and a counterclockwise (CCW) beam to propagate in opposite directions around said at least one of said ring and said coil;
   phase modulation means for generating a phase modulation signal for applying a phase modulation between said CW and CCW beams at a modulation frequency (f);
   means for combining said CW and CCW beams after passage around said at least one of said ring and said coil;

detector means for detecting said combined CW and CCW beams; and processor means for monitoring an intensity of an output of said detector means at a plurality of integral multiples of said modulation frequency (f), said processor means including:

reference signal generating means for generating a plurality of reference signals corresponding to each of said integral multiples of said modulation frequency, and, for each one of said plurality of reference signals, adjusting a relative phase thereof between a plurality of values, said reference signal generating means shifting said relative phase of each one of said plurality of reference signals by 0°, 90°, 180°, 270°, and means for monitoring a magnitude of respective components of said intensity of said detected signal at said modulation frequency (f) and at higher harmonics thereof, and for monitoring ratios of said components and thereby determining a magnitude of a rate applied to said laser gyroscope.

6. A laser gyroscope according to claim 5, wherein said processor means monitors magnitudes I1, I2, I4 of said components of said detected signal at said modulation frequency (f), and at second and fourth harmonics (2f and 4f) of said modulation frequency (f), and determines the following ratios:

$$R_1 = \frac{I_1}{I_2} = \frac{J_1(\beta)}{J_2(\beta)} \tan(S\Omega) \quad \text{Equation (2)}$$

$$R_2 = \frac{I_4}{I_2} = \frac{J_4(\beta)}{J_2(\beta)} \quad \text{-continued}$$

wherein $\beta$ is the modulation depth, S is the scale Factor, $J_n(\beta)$ is the $n^{th}$ Bessel function of $\beta$ where n=1, 2 and 4, and $\Omega$ is the applied rate, the magnitude of the angular rate being determined from the following formula:

$$\Omega = \frac{1}{S} \tan^{-1}\left( \frac{R_1 J_2(\beta)}{J_1(\beta)} \right). \quad \text{Equation (3)}$$

7. A laser gyroscope according to claim 5, wherein said processor means further includes mixer means for demodulating said output of said detector means, to thereby determine in-phase and quadrature components of said intensity at said modulation frequency (f).

8. A laser gyroscope according to claim 7, wherein said in-phase ($I_i$) and quadrature ($I_q$) components are determined according to the following formulae, wherein I(X) is an intensity at phase X°:

$$I_i = \frac{I(0) - I(180)}{2} \quad \text{Equation (4)}$$

$$I_q = \frac{I(90) - I(270)}{2}.$$

* * * * *